US007895937B2

(12) United States Patent
Frank et al.

(10) Patent No.: US 7,895,937 B2
(45) Date of Patent: Mar. 1, 2011

(54) PISTON HAVING TWISTED SKIRT PANELS

(75) Inventors: Timothy David Frank, Elkhart, IN (US); David Edward Ramey, Grand Blanc, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 570 days.

(21) Appl. No.: 11/937,276

(22) Filed: Nov. 8, 2007

(65) Prior Publication Data

US 2008/0105118 A1 May 8, 2008

Related U.S. Application Data

(60) Provisional application No. 60/864,827, filed on Nov. 8, 2006.

(51) Int. Cl.
*F16J 1/04* (2006.01)

(52) U.S. Cl. .......................................... 92/237; 92/238

(58) Field of Classification Search .................. 92/208, 92/237, 238

See application file for complete search history.

(56) References Cited

U.S. PATENT DOCUMENTS 5,063,893 A 11/1991 Iwaya
5,331,932 A 7/1994 Watanabe et al.
5,379,680 A * 1/1995 Bohm et al. .................. 92/208
6,152,016 A 11/2000 Bahr et al.
6,152,017 A 11/2000 Harrer et al.
6,588,320 B2 7/2003 Gaiser et al.
6,860,190 B2 3/2005 Oversby et al.
6,862,977 B2 3/2005 Glinsner et al.

FOREIGN PATENT DOCUMENTS

DE 19643778 5/1998
EP 0838587 4/1998
EP 1348859 A2 1/2003
WO 0072116 A2 11/2000

* cited by examiner

*Primary Examiner*—F. Daniel Lopez
(74) *Attorney, Agent, or Firm*—Robert L. Stearns; Dickinson Wright, PLLC

(57) ABSTRACT

A piston assembly is disclosed herein. The piston assembly is integrally formed and unitary and is centered on a central longitudinal axis. The piston assembly includes a head with ring belt having a plurality of ring grooves. The piston assembly also includes first and second skirts, each having a top edge and a bottom edge being radially narrower than the top edge. The skirts also include first and second side edges. The piston assembly also includes first and second pin bosses spaced radially inward from the ring belt to define a short-pin support arrangement. The pin bosses include respective first and second pin bores axially aligned on a pin bore axis perpendicular to the central longitudinal axis. The piston assembly also includes a plurality of panels, each extending between one of the pin bosses and one of the skirts. Each of the panels include a top portion spaced closest to the head and bottom portion spaced furthest the head and a middle portion disposed substantially equally spaced from the top and bottom portions. Each of the panels twists along its length such that a ratio defined by a first distance between the top portion and a first plane perpendicular to the pin bore axis over a second distance between the bottom portion and the first plane increases along at least part of the length.

2 Claims, 6 Drawing Sheets

14 56 68 44 58 62 70 64 40 72 60 66 40

PISTON HAVING TWISTED SKIRT PANELS

CROSS-REFERENCE TO RELATED APPLICATIONS

This application claims the benefit of U.S. Provisional Patent Application Ser. No. 60/864,827 for a PISTON HAVING TWISTED SKIRT PANELS, filed on Nov. 8, 2006, which is hereby incorporated by reference in its entirety.

BACKGROUND OF THE INVENTION

1. Field of the Invention

This invention relates generally to pistons for internal combustion engines and, more particularly, to those having a unified piston skirt coupled to pin bosses of the piston by skirt panels.

2. Description of Related Prior Art

Pistons for internal combustion engines can be made of various metals and are often die cast from a light metal such as aluminum or alloys of aluminum. Such pistons include a piston head formed with a plurality of ring grooves for accommodating piston rings and a pair of pin bosses project downwardly from the piston head and formed with axially aligned pin bores for receiving a wrist pin to couple the piston to an associated connecting rod of the engine. Such pistons further include a pair of skirt portions each joined to the pin bosses by associated skirt panels which are typically planer or curved in shape.

SUMMARY OF THE INVENTION

In summary, the invention is a piston assembly. The piston assembly is integrally formed and unitary and is centered on a central longitudinal axis. The piston assembly includes a head with ring belt having a plurality of ring grooves. The piston assembly also includes first and second skirts, each having a top edge and a bottom edge being radially narrower than the top edge. The skirts also include first and second side edges. The piston assembly also includes first and second pin bosses spaced radially inward from the ring belt to define a short-pin support arrangement. The pin bosses include respective first and second pin bores axially aligned on a pin bore axis perpendicular to the central longitudinal axis. The piston assembly also includes a plurality of panels, each extending between one of the pin bosses and one of the skirts. Each of the panels include a top portion spaced closest to the head and bottom portion spaced furthest the head and a middle portion disposed substantially equally spaced from the top and bottom portions. Each of the panels twists along its length such that a ratio defined by a first distance between the top portion and a first plane perpendicular to the pin bore axis over a second distance between the bottom portion and the first plane increases along at least part of the length.

The twisting of the panels has the advantage of enabling the pin bosses to be closely spaced while accommodating and properly supporting variable width pistons. According to a particular advantage, the pin bosses can be kept relatively narrow to save on size and weight and the skirts can be made with a width that is significantly greater at the top of the skirts than at the bottom. According to a further advantage, the edges of the skirts can be curved and the panels can join along all or a part of the edges of the skirts and follow the contour, while being joined at the other end to the pin bosses in a generally vertical orientation or canted slightly inwardly toward one another. The twisting of the panel in the lengthwise direction enables the panels to transition from the orientation at the connection to the pin bosses to the variable width and curved orientation at the edges of the skirts.

These and other features and advantages of the invention will become better understood to those of ordinary skill in the art when considered in connection with the following detailed description and drawings.

DETAILED DESCRIPTION OF A PREFERRED EMBODIMENT

Figure 1:
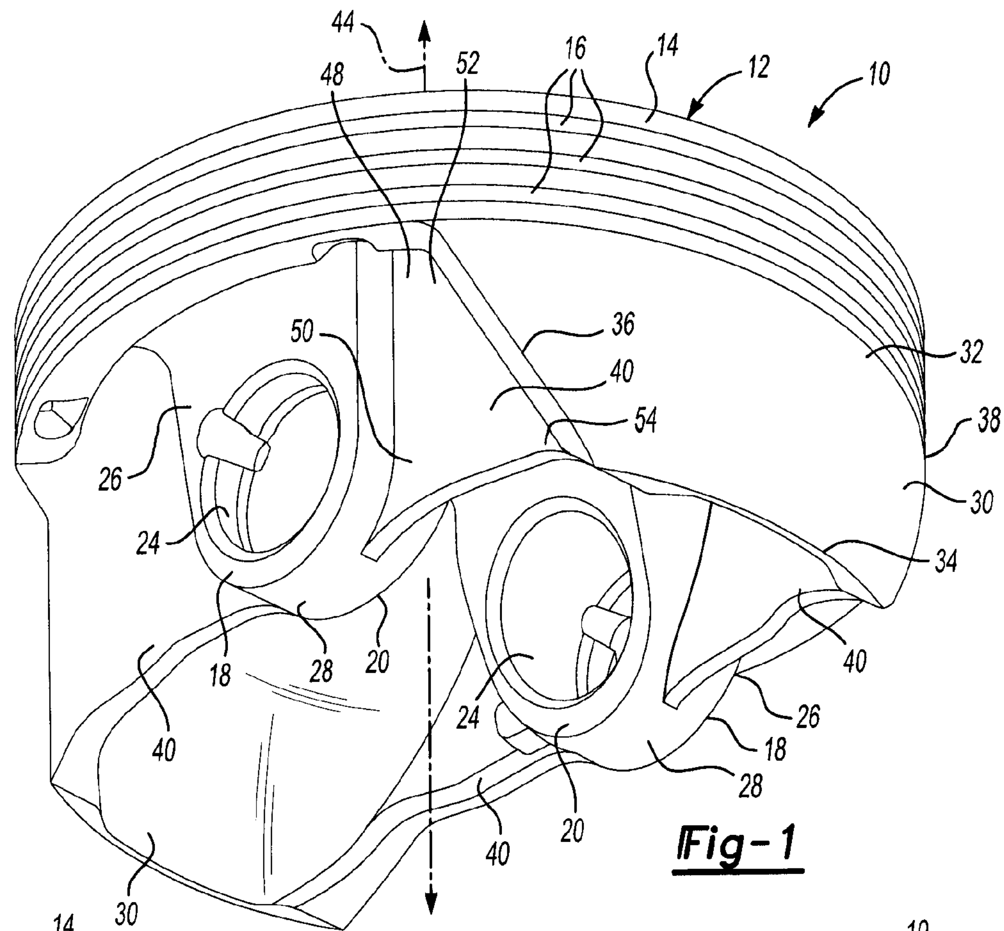
FIG. 1 is a bottom perspective view of a piston constructed according to an embodiment of the invention.

A piston assembly is shown generally at 10 in the figures and includes a piston head 12 formed with an annular ring belt portion 14 in which a plurality of ring grooves 16 are provided for accommodating a set of piston rings (not shown).

As best shown in FIGS. 1-11, the piston 10 includes a pair of pin bosses 18 which are formed as one piece with a head 12 of the same material. The pin bosses 18 extend downwardly from the underside of the head 12 and have inner faces 20 that are spaced laterally from one another across a gap 22. The pin bosses 18 are formed with axially aligned pin bores 24 for receiving a wrist pin (not shown) to couple the piston 10 to a small end of a connecting rod (not shown) extended into the gap 22 from below. The inner faces 20 may be either straight or tapered, as shown, to compliment the shape of the small end of the connecting rod. The pin bosses 18 have outer faces 26 opposite the inner faces 20 which are located radially inwardly of a ring belt 14 of the piston assembly 10. An outer wall 28 of the pin bosses 18 extends between the inner 18 and outer 26 faces.

The piston 10 includes a pair of piston skirts 30 which are made as one piece with the piston 10. The skirts 30 extend downwardly from a top edge 32 adjacent to the piston head 12 to a bottom free edge 34. The skirts 30 extend circumferentially between opposite side edges 36, 38 which extend between the top edge 32 and bottom edge 34 of the skirts. As illustrated, the skirts 30 are radially wider at the top edge 32 than at the bottom edge 34 and present a generally trapezoidal shape to the skirts 30, with the top and bottom being generally parallel and the sides non-parallel. The side edges 36, 38 of the skirts may be curved or bowed or may be straight relative to a central longitudinal axis 44 of the piston assembly 10.

Several different rectilinear widths perpendicular to the central longitudinal axis 44 of the piston assembly 10 can be defined. A first rectilinear width can be defined between the outer radial surfaces of the skirts 30 at the top edge 32 along an axis perpendicular to an axis 46 of the pin bores 24. A second rectilinear width can be defined between the between the outer faces 26 of the pin bosses 18 along the pin bore axis 46. This first rectilinear width is greater than the second rectilinear width. The rectilinear distance between the opposite ends of the edge 34, in a plane normal to the central longitudinal axis 44 of the piston assembly 10, is less than the second rectilinear width between the outer faces 26. However, the rectilinear distance between the opposite ends of the top edge 32, in a plane normal to the central longitudinal axis 44 of the piston assembly 10, is greater than the second rectilinear width between the outer faces 26.

The piston 10 includes skirt panels 40 that join the skirts 30 to the pin bosses 18. The panels are fabricated as one piece with the pin bosses 18 and skirts 30 of the same material and are spaced radially inwardly of the ring belt 14. In view of the geometry of the pin bosses 18 and the skirts 30 set forth above, the each panel 40 is twisted relative to the central longitudinal axis 44 of the piston assembly 10 in order to integrally merge with both a pin boss 18 on one side and a skirt 30 on the other side.

Figure 2:
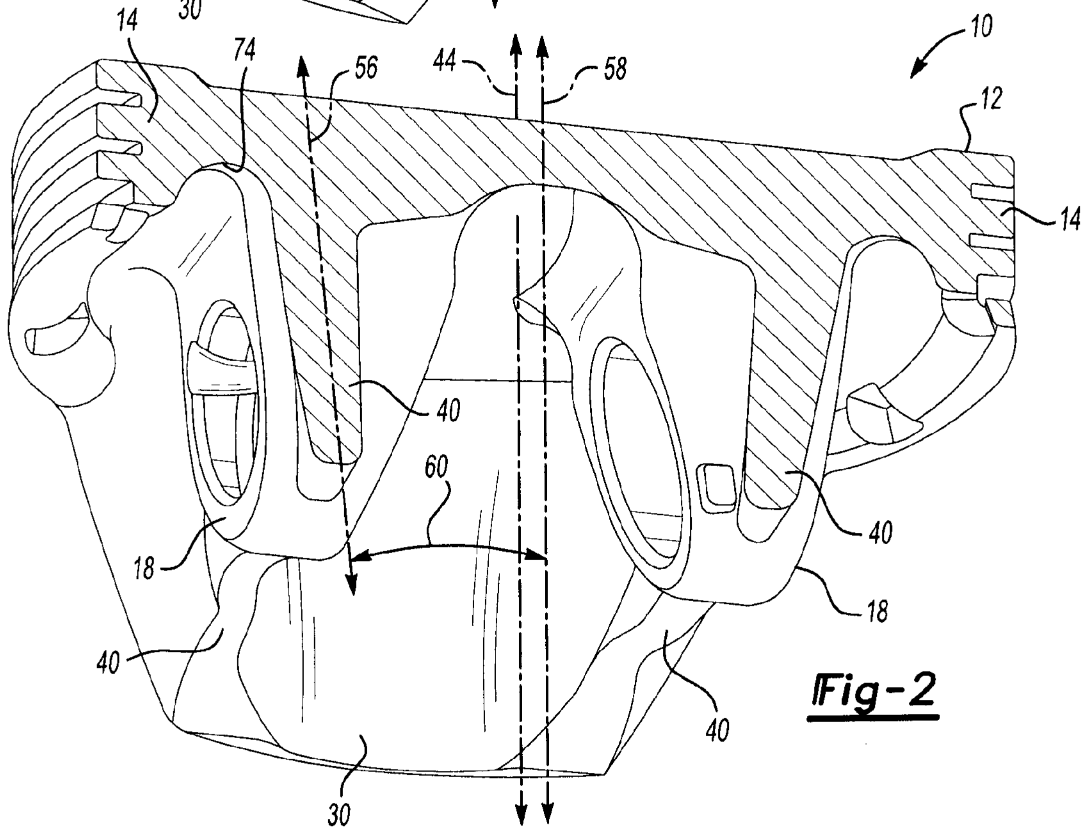
FIGS. 2-9 are cross-sectional views of the piston of FIG. 1 taken in the general direction of arrow A illustrating the changing shape of the panels in their lengthwise direction.
Figure 3:
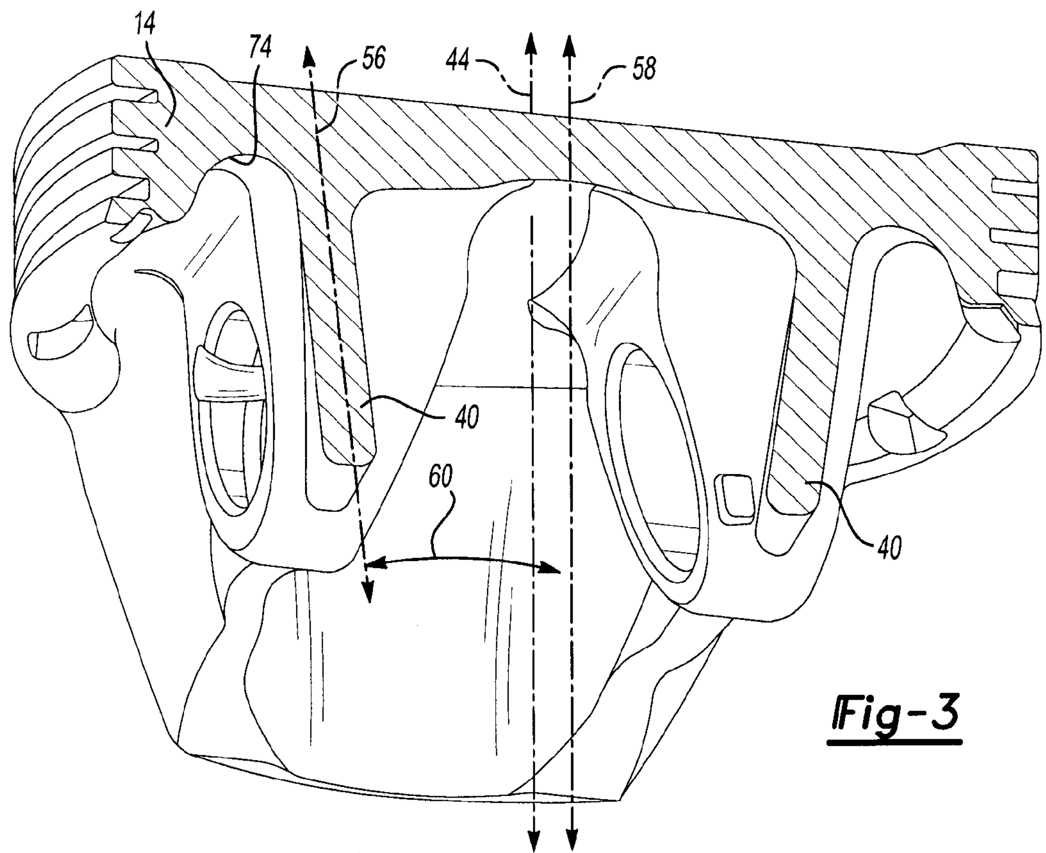

In the exemplary embodiment of the invention, with particular reference to FIG. 1, the panel 40 extends away from the pin bore 18 at a first top corner 48 adjacent to the head 32 and at a first bottom corner 50 opposite the first top corner 48. The panel 40 extends to a second top corner 52 adjacent to the head 32 and to a second bottom corner 54. FIGS. 2-9 are a progression of views that show the twisting of the panel 40. Each of these views is in perspective and show a cross-section of the piston assembly 10 through the panel 40. Each of the respective cross-sections in FIGS. 2-9 is taken in planes disposed progressively outward from the central longitudinal axis 44. For example, the cross-section shown in FIG. 2 is in first plane parallel to and spaced from the axis 44. The cross-section shown in FIG. 3 is in second plane parallel to the axis 44 and spaced further from the axis 44 than the first plane. In these Figures, two reference axes 56 and 58 and an angle 60 have been added to provide a consistent source of reference. In particular, the axis 56 extends in the plane of the particular cross-section and is substantially centered along a thickness of the panel 40. The axis 58 also extends in the plane of the particular cross-section, is parallel to the central longitudinal axis 44, and is substantially centered between two opposing panels 40. The angle 60 is the angle between the axes 56 and 58

FIG. 2 shows a cross-section in a first plane parallel to and spaced a first distance from the axis 44. The first plane of FIG. 2 is taken substantially through the corners 48, 50 proximate to the pin bore 18. The angle 60 is relatively small, the intersection between the axes 56, 58 being outside of the field of view. In alternative embodiments of the invention, the axes 56, 58 may be parallel in the first proximate plane.

FIG. 3 shows a cross-section in a second plane parallel to and spaced a second distance from the axis 44 greater than the first distance. The angle 60 is substantially unchanged from FIG. 2, representing that the panel 40 as extended substantially straight and untwisted between the first and second planes. In alternative embodiments of the invention, the plane 40 could twist over its entire length and thereby not include any straight portions.

Figure 4:
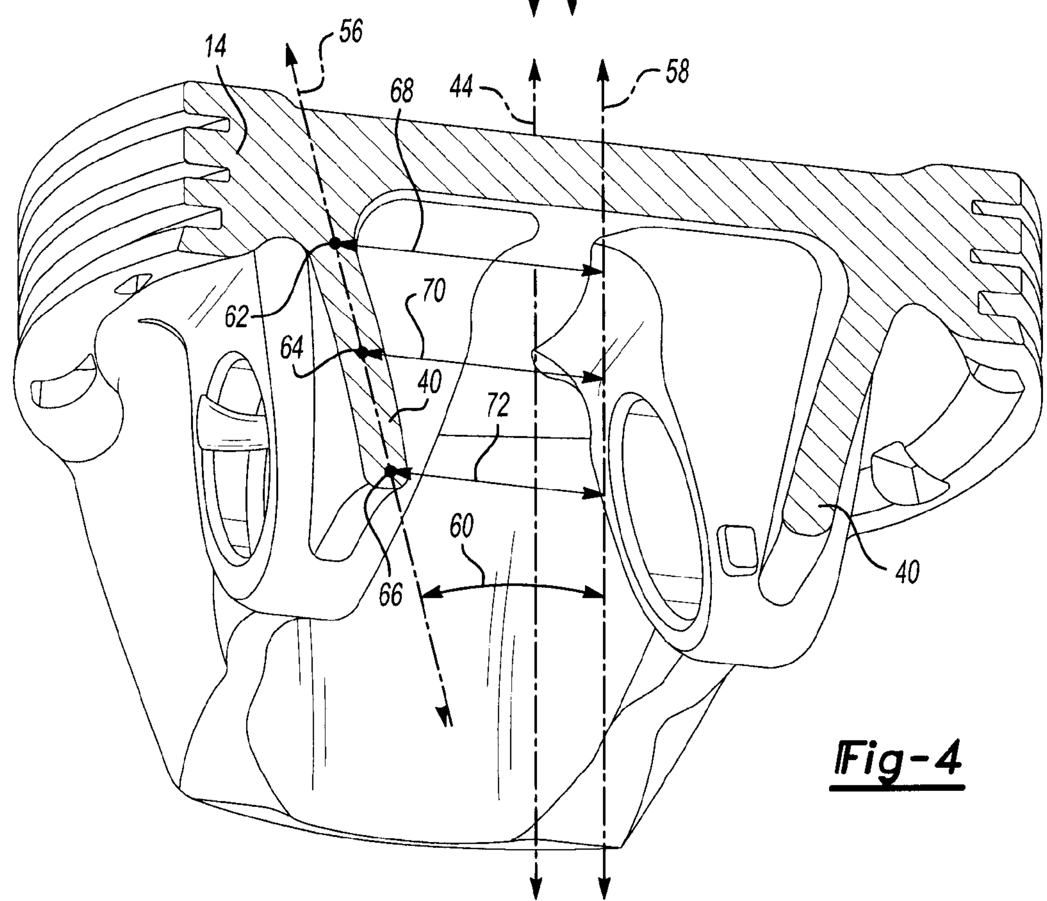

FIG. 4 shows a cross-section in a third plane parallel to and spaced a third distance from the axis 44 greater than the second distance. The angle 60 has increased from FIG. 3, representing that the panel 40 as begun to twist between the second and third planes. The panel 40 is twisted so that it intersects the side edge 36 or 38 of one of the skirts 30. The twisting is accomplished such that the top of the panel 40 gently extends from a pin bore 18 of a relatively short-pin type arrangement to intersect the top edge 32 of a relatively wide-top skirt 30 and, at the same time, that the bottom of the panel 40 gently extends to intersect the relatively narrow-bottom edge 34 of the skirt 30.

The twisting of the panel 40 can be defined in several different ways. The exemplary panel 40 includes an upper point 62, a midpoint 64 and a lower point 66 disposed along the axis 56. In FIG. 3, the upper point 62 is a distance 68 from the axis 58, the midpoint 64 is a distance 70 from the axis 58, and the lower point 66 is a distance 72 from the axis 58. In one example of twisting, the panel 40 can be formed such that distance 68 increases as the panel 40 extends outwardly from the first plane to the third plane. Twisting can also be defined by concurrently increasing the distance 68 and decreasing the distance 72 as the panel 40 extends outwardly away from the axis 44. Alternatively, the twisting could be defined by maintaining the distance 72 to be constant and concurrently increasing the distances 68 and 70 as the panel 40 extends outwardly. Alternatively, all of the distances 68, 70, 72 can change together, all increasing or decreasing, but at different rates as the panel 40 extends away from the axis 44.

Figure 5:
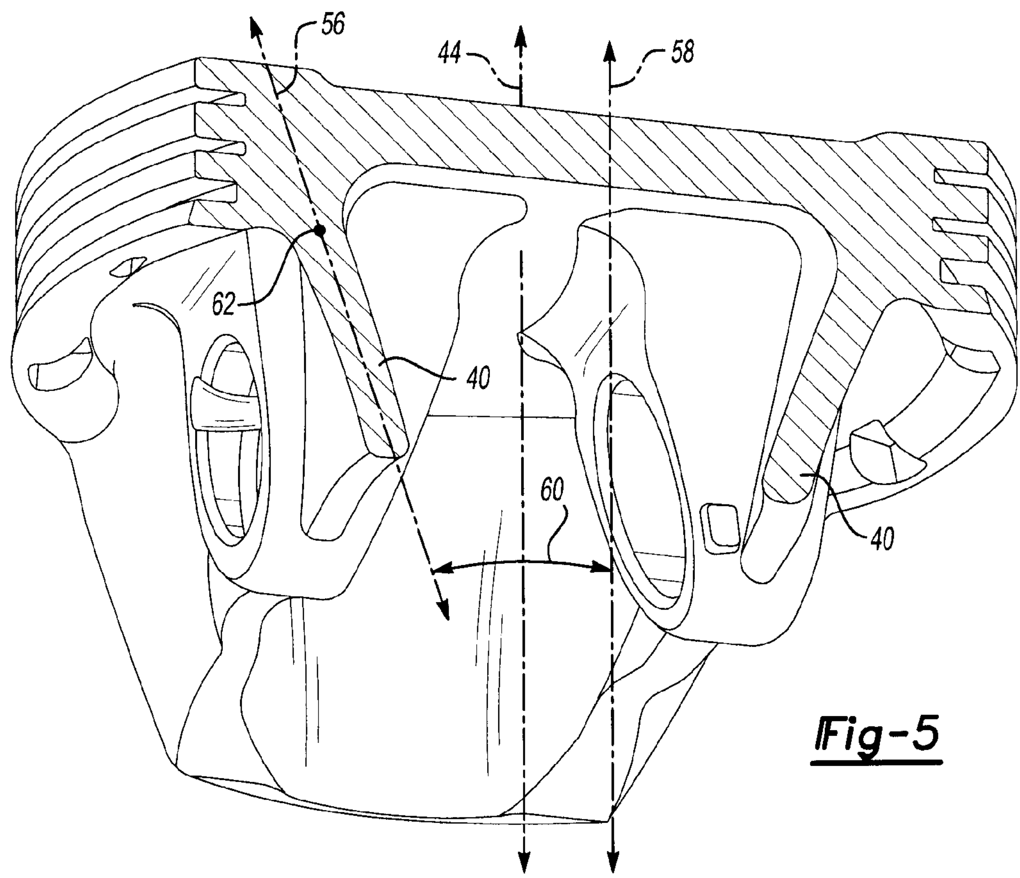

FIG. 5 shows a cross-section in a fourth plane parallel to and spaced a fourth distance from the axis 44 greater than the third distance. The angle 60 has increased from FIG. 4, representing further twisting of the panel 40. In the exemplary embodiment of the invention, FIG. 5 also shows that the top point 62 merged with the ring belt 14. In FIGS. 2-4, a recess 74 is shown between the ring belt 14 and the panel 40. FIG. 5 shows that the recess 74 has been eliminated in the fourth plane. As set forth above, the merging of the ring belt 14 and the panel 40 may occur because the top point 62 of the panel 40 shifts away from the axis 58 in the plane of reference or simply because, as the plane of reference is spaced further from the axis 44, the outer radial edge of the circular ring belt 14 will be spaced closer to the axis 58.

Figure 6:
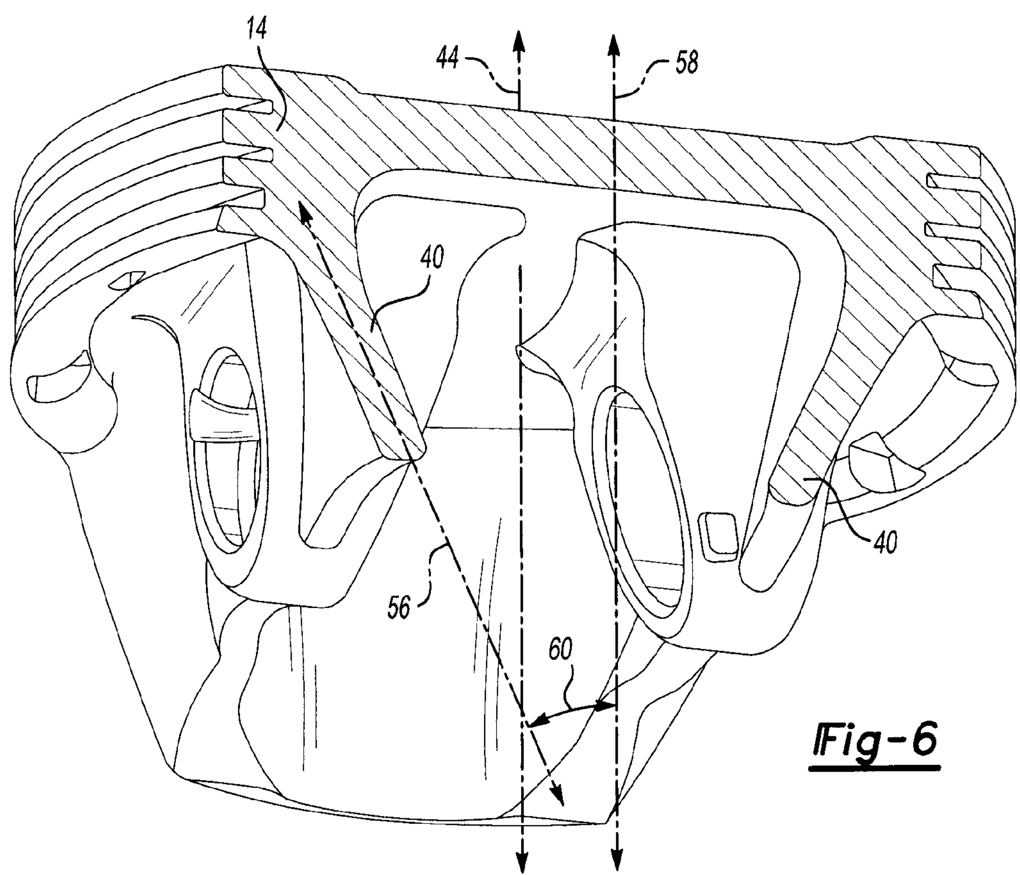
Figure 7:
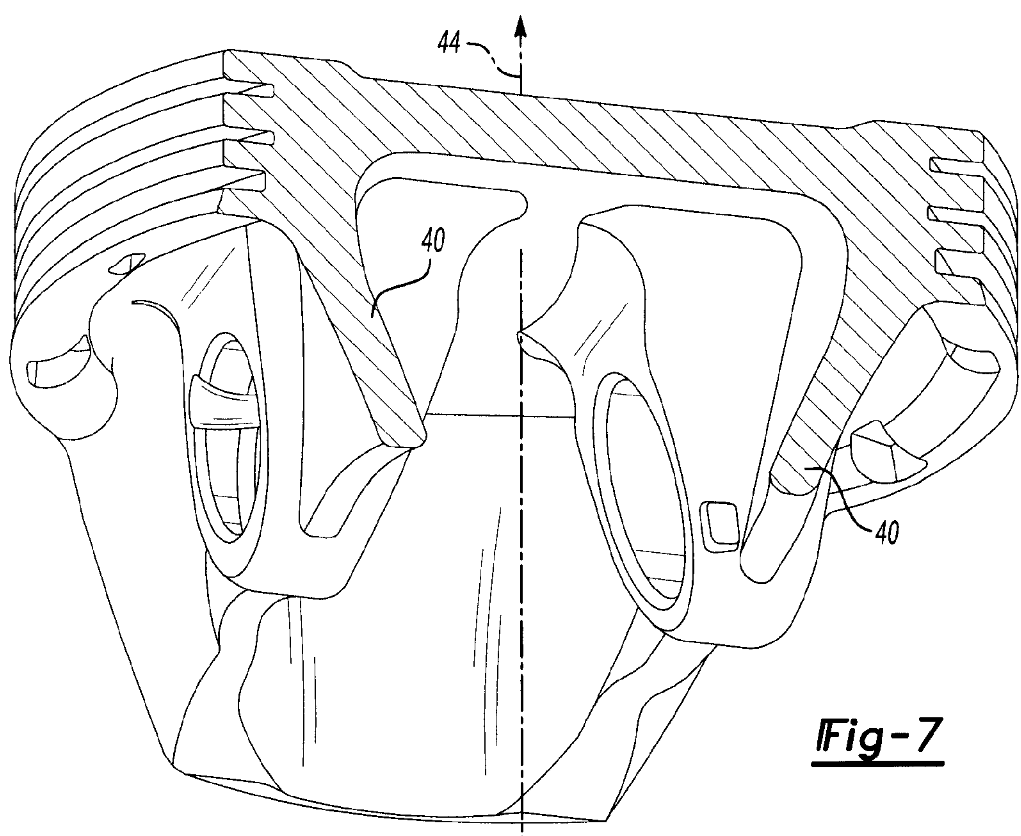
Figure 8:
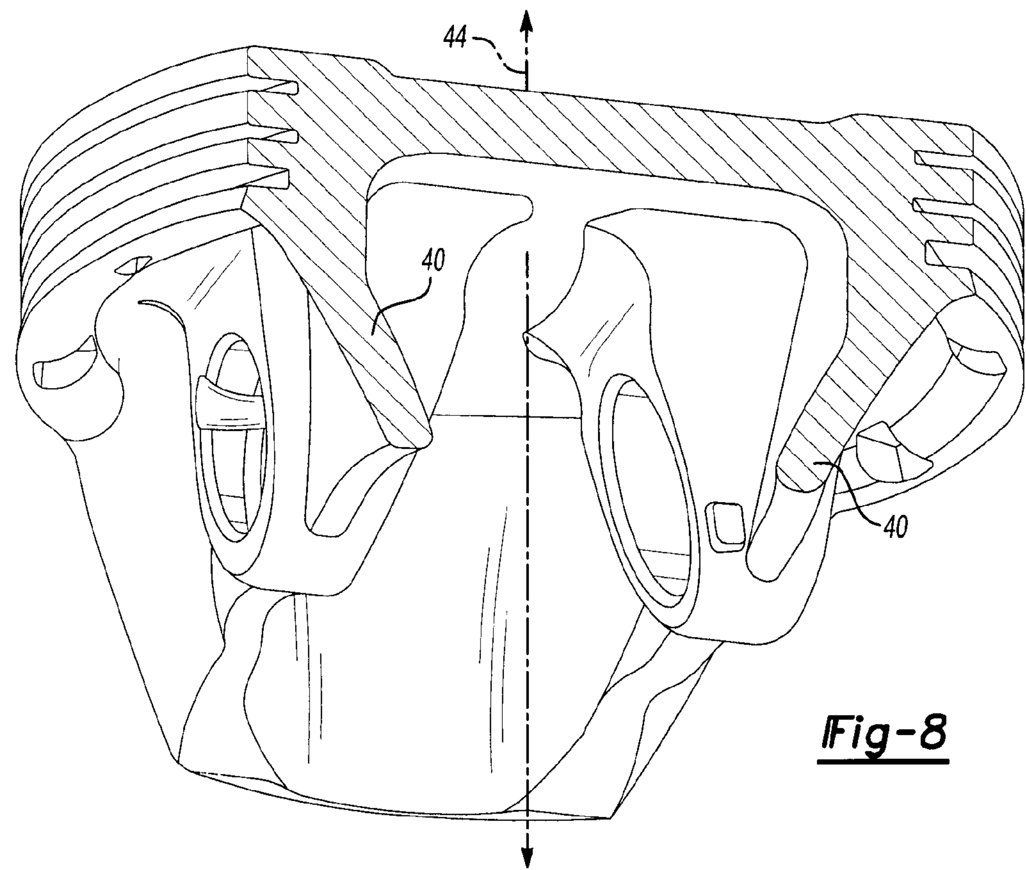
Figure 9:
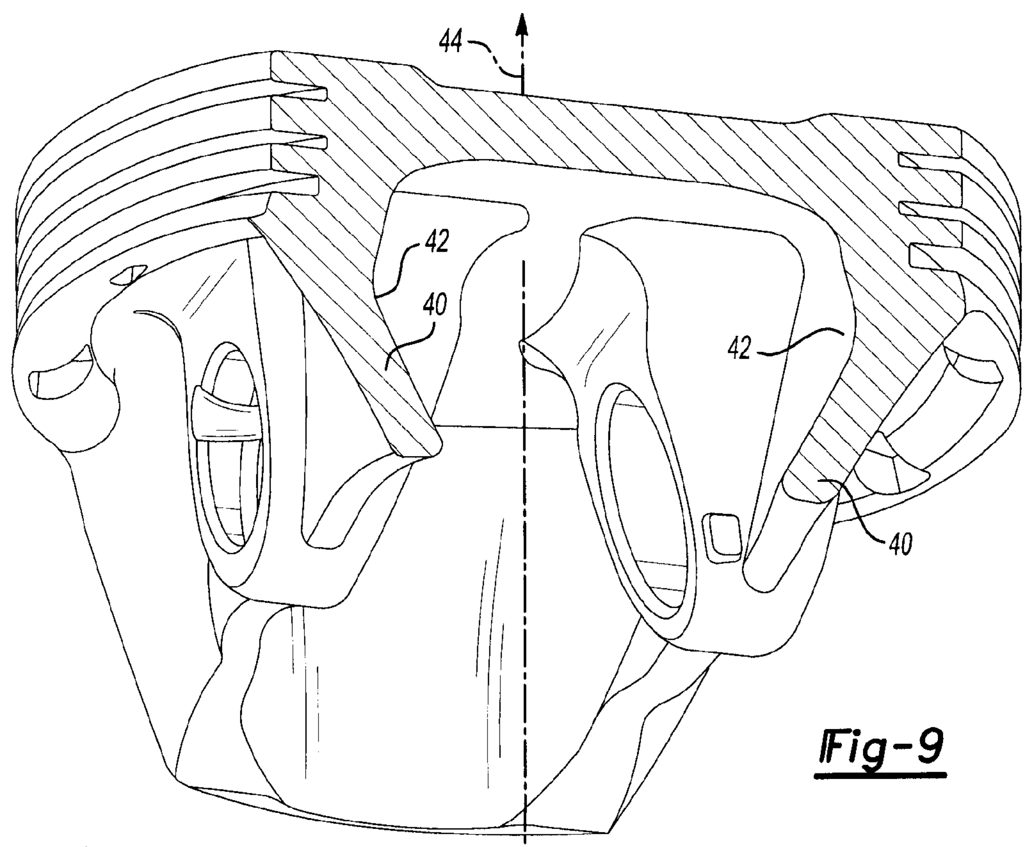
Figure 10:
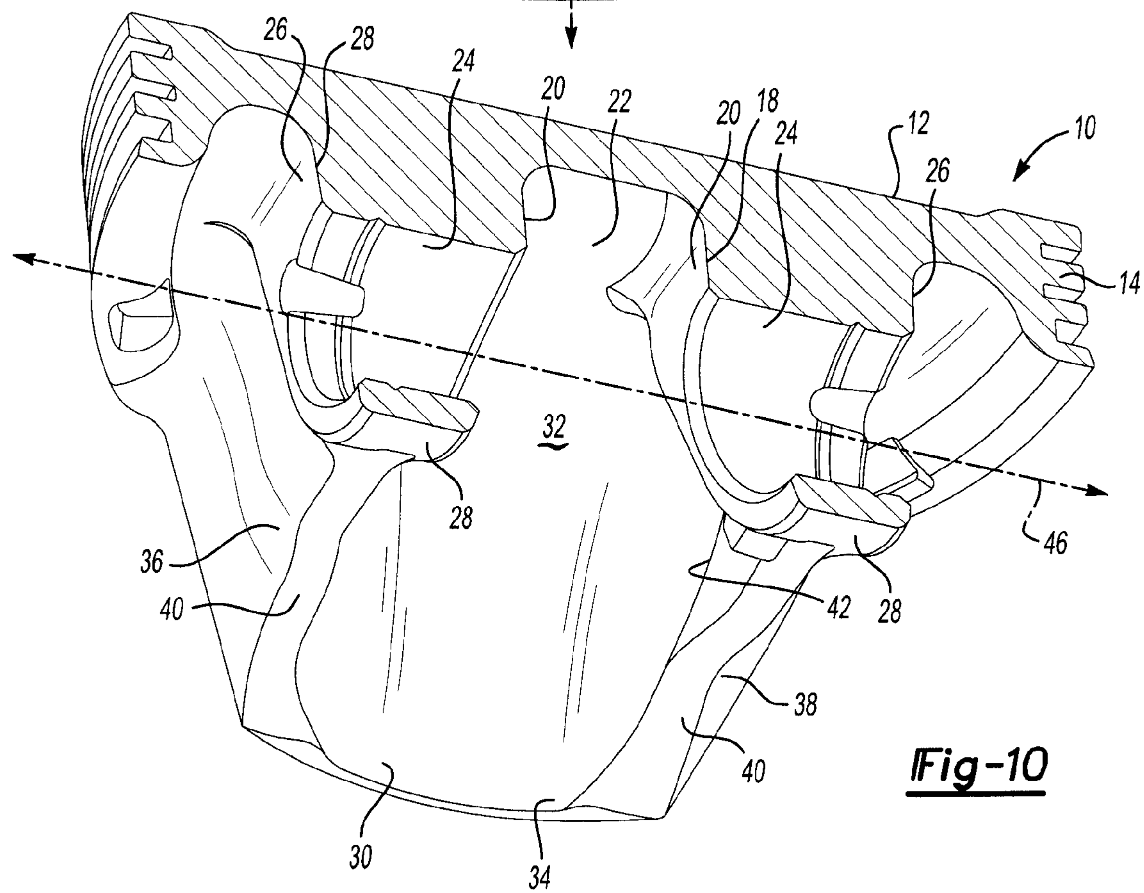
FIG. 10 is a cross-sectional view taken along the pin bore axis of the piston of FIG. 1.
Figure 11:
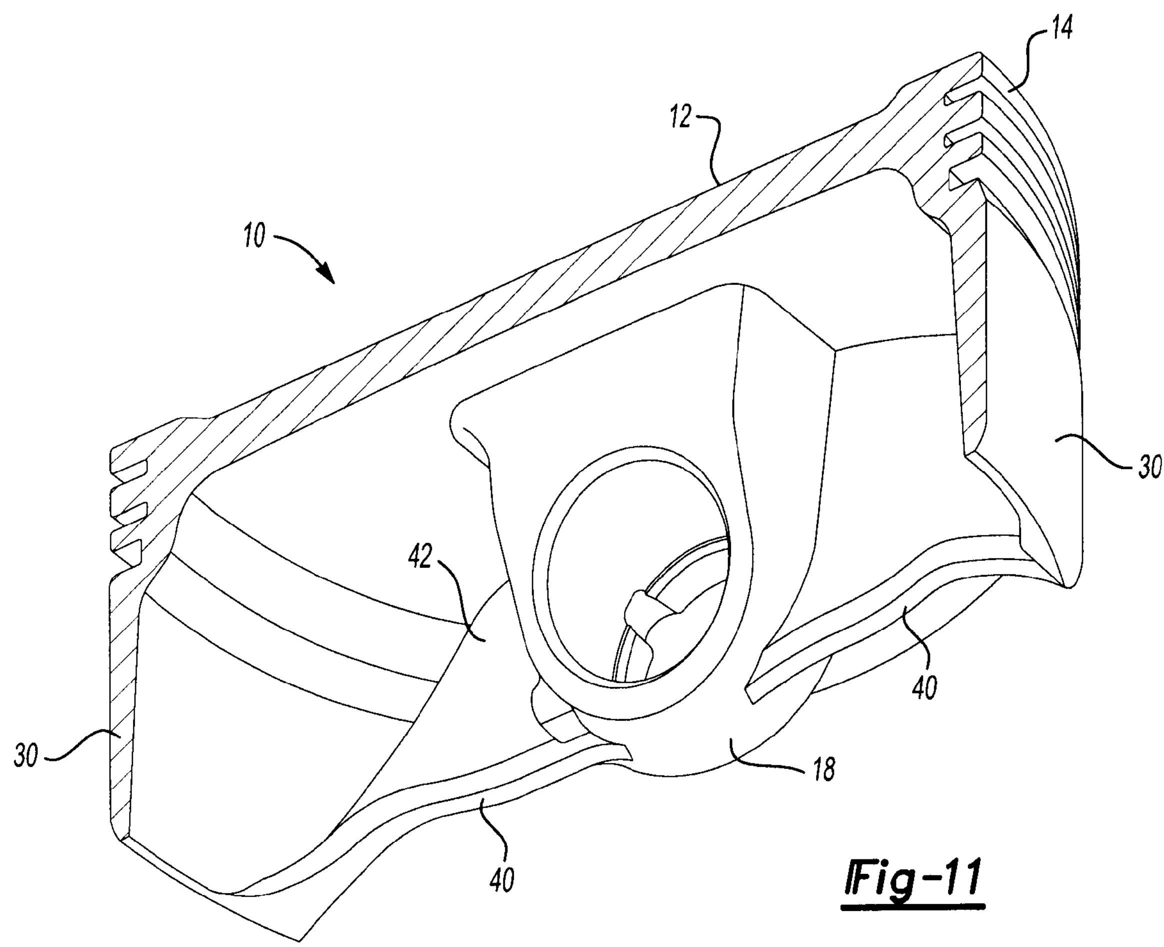
FIG. 11 is cross-sectional view taken generally through the skirts generally perpendicular to the view of FIG. 10.

FIG. 6 shows a cross-section in a fifth plane parallel to and spaced a fifth distance from the axis 44 greater than the fourth distance. The angle 60 has increased from FIG. 5, representing further twisting of the panel 40. Also, the top of the panel 40 has moved closer to the radially outer surface of the ring belt 14. FIGS. 7-9 respectively show cross-sections in a sixth-eighth planes, each parallel to and spaced from one another. These figures show the continual twisting of the panel 40 as merges with the edge 36 of the skirt 30.

One panel 40 extends from each side of each pin boss 18 and is joined at the other end to an associated side edge 36, 38 of the skirts 30. As such, each skirt 30 has a pair of skirt panels 40 associated therewith. The panels 40 intersect the pin bosses 18 at the outer wall 28 thereof at a location about midway between the inner and outer faces 20, 26 relative to the bottom end of the pin bosses 18 (the narrowest part of the pin bosses 18 in the case of tapered pin bosses as shown).

The panels 40 are generally parallel or canted slightly inward relative to the central longitudinal axis 44 of the piston assembly 10 at the location where they intersect the pin bosses 18. This is best seen in FIG. 2. However, as the panels extend lengthwise toward the side edges 36, 38 of the skirts 40, it can be necessary that the panels 40 move out of their initial plane such that they can match up at the other end with the shape and location of the skirt edges 36, 38.

Figure 12:
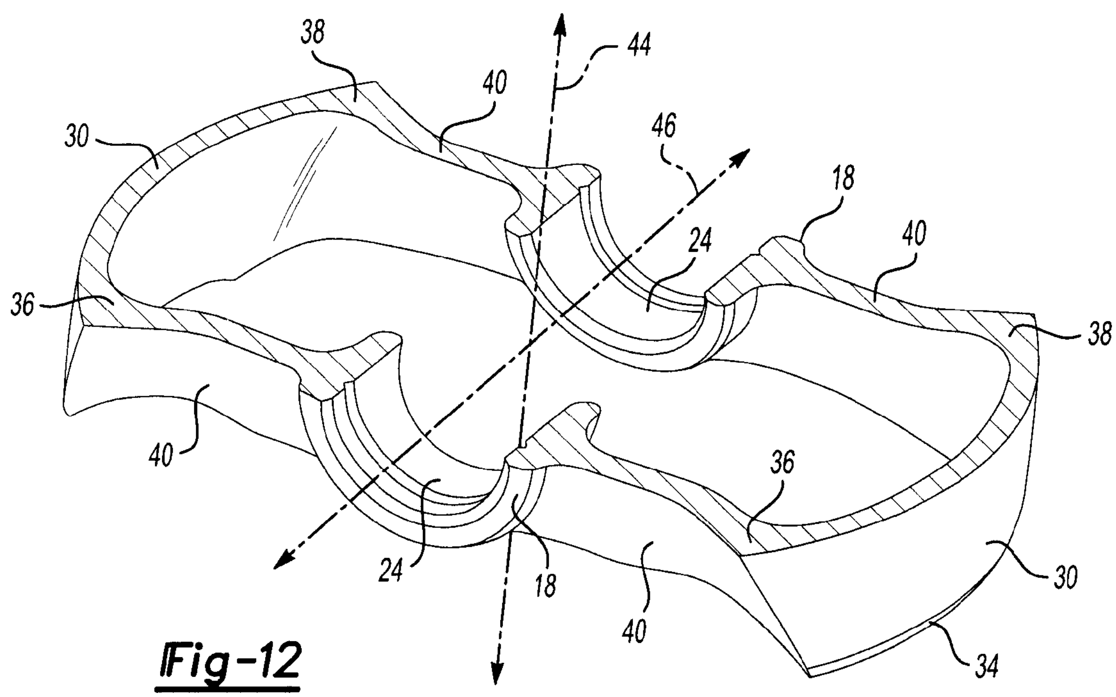
FIG. 12 is a cross-sectional view taken generally in the direction of arrow B of FIG. 1.

As illustrated by the series of cross sectional views of FIGS. 3-9, the panels 40 are twisted in the lengthwise direction to conform to the shape and orientation of their connections at the pin bosses 18 and skirts 40. At the bottom of the piston, the panels 40 can be twisted inwardly to meet up with side edges 36, 38 of the skirt 40 adjacent to the bottom edge 34 of the skirts, which are narrower in spacing than the spacing of the panels 40 at the pin bosses 18. At the top of the piston 10, the panels 40 can be twisted outward to meet up with the wider and outwardly angled outer edges 36, 38 of the skirts 30 at the top edge 32 of the skirts 30. The surface of the panels 40 is thus represented by a twisted plane shape, or curve of double curvature, with the panels 40 being twisted in both the lengthwise direction of the panels 40 and the longitudinal direction of the piston (see additionally FIG. 12). Of course, the exact twist configuration of the panels 40 will necessarily depend upon the requirements of the particular piston, and thus the shape illustrated is only one exemplary embodiment.

The Figures also show that the panel 40 can be flared to merge with the edge 36 or 38 of the skirt 30. In particular, the height of the panel 40 measured along the central longitudinal axis 44 can be less than the height of the skirt 30 (the distance along the axis 44 between the top edge 32 and edge 34). In such an embodiment of the invention, the bottom portion of the panel 40 can flare downwardly so that the full length of the edge 36 or 38 is supported by the panel 40.

The shape of the panels 40, skirts 30 and underside of the head 12 define an interior space on either side of the pin bosses 18 that has undercut regions 42 near the top edge 32 of the skirts 30 where the panels 40 join the edges 36, 38 of the skirts as best shown in FIG. 9.

The piston may be cast entirely as one piece from any selected material, such as aluminum, steel or the like and incorporating the twisted panels 40 as described above.

The design of any particular piston involves a balancing of several factors, including mass and strength. The orientation of the panel twisting in the invention allows for a short pin arrangement to be incorporated into a range of pistons having different diameters. Specifically, the twisting of the panel 40 such that the top of the panel becomes spaced further from a plane contain It is to be understood that other embodiments of the invention which accomplish the same function are incorporated herein within the scope of any ultimately allowed patent claims.

What is claimed is:

1. A piston assembly comprising:

a head with an integrally formed and unitary ring belt having a plurality of ring grooves and centered on a central longitudinal axis;

first and second skirts integrally formed and unitary with said head and extending along said axis, each of said first and second skirts having a top edge adjacent said ring belt and a bottom edge spaced from said top edge along said axis and being radially narrower than said top edge and first and second side edges;

first and second pin bosses integrally formed and unitary with said head and extending along said axis, said first and second pin bosses being mirror images of one another across said axis and being spaced radially inward from said ring belt to define a short-pin support arrangement, and formed with respective first and second pin bores axially aligned on a pin bore axis perpendicular to said central longitudinal axis;

a plurality of panels integrally formed and unitary with said head and each extending between one of said first and second pin bosses and one of said first and second skirts, said plurality of panels including first and second panels being mirror images of one another across a first plane containing said central longitudinal axis and perpendicular to said pin bore axis and also including third and fourth panels being minor images of one another across said first plane, wherein said first and third panels are mirror images of one another across a second plane containing both said central longitudinal axis and said pin bore axis, and wherein said second and fourth panels are minor images of one another across said second plane, and wherein each of said panels include a top portion spaced closest to said head and bottom portion spaced furthest said head and a middle portion disposed substantially equally spaced from said top and bottom portions, and wherein each of said panels extends away from one of said pin bosses in a direction perpendicular to said second plane and over a rectilinear length to merge with one of said skirts, and wherein each of said panels twists along said length such that a ratio defined by a first distance between said top portion of said panel and said first plane over a second distance between said bottom portion of said panel and said first plane increases along at least part of said length; and wherein such said ratio increases because said first distance increases over at least part of said length and said second distance decreases over at least part of said length.

2. A piston assembly comprising:

a head with an integrally formed and unitary ring belt having a plurality of ring grooves and centered on a central longitudinal axis;

first and second skirts integrally formed and unitary with said head and extending along said axis, each of said first and second skirts having a top edge adjacent said ring belt and a bottom edge spaced from said top edge along said axis and being radially narrower than said top edge and first and second side edges;

first and second pin bosses integrally formed and unitary with said head and extending along said axis, said first and second pin bosses being mirror images of one another across said axis and being spaced radially inward from said ring belt to define a short-pin support arrangement, and formed with respective first and second pin bores axially aligned on a pin bore axis perpendicular to said central longitudinal axis;

a plurality of panels integrally formed and unitary with said head and each extending between one of said first and second pin bosses and one of said first and second skirts, said plurality of panels including first and second panels being mirror images of one another across a first plane containing said central longitudinal axis and perpendicular to said pin bore axis and also including third and fourth panels being minor images of one another across said first plane, wherein said first and third panels are mirror images of one another across a second plane containing both said central longitudinal axis and said pin bore axis, and wherein said second and fourth panels are minor images of one another across said second plane, and wherein each of said panels include a top portion spaced closest to said head and bottom portion spaced furthest said head and a middle portion disposed substantially equally spaced from said top and bottom portions, and wherein each of said panels extends away from one of said pin bosses in a direction perpendicular to said second plane and over a rectilinear length to merge with one of said skirts, and wherein each of said panels twists along said length such that a ratio defined by a first distance between said top portion of said panel and said first plane over a second distance between said bottom portion of said panel and said first plane increases along at least part of said length; and wherein such said ratio increases because said first distance increases over at least part of said length at a first rate and said second distance increases over at least part said length at a second rate less than said first rate.

* * * * *